United States Patent
Huang

[11] Patent Number: 5,816,934
[45] Date of Patent: *Oct. 6, 1998

[54] GOLF CLUB GRIP AND METHOD OF MAKING SAME

[76] Inventor: Ben Huang, 19472 Woodlands La., Huntington Beach, Calif. 92648

[ * ] Notice: The term of this patent shall not extend beyond the expiration date of Pat. No. 5,584,482.

[21] Appl. No.: 806,643

[22] Filed: Feb. 25, 1997

Related U.S. Application Data

[63] Continuation-in-part of Ser. No. 787,828, Jan. 23, 1997, Pat. No. 5,730,669, which is a continuation-in-part of Ser. No. 567,339, Dec. 28, 1995, abandoned, which is a continuation-in-part of Ser. No. 542,009, Nov. 13, 1995, Pat. No. 5,645, 501, which is a continuation-in-part of Ser. No. 58,313, Mar. 3, 1993, Pat. No. 5,695,418, which is a continuation-in-part of Ser. No. 953,190, Sep. 29, 1992, abandoned, which is a continuation-in-part of Ser. No. 890,383, May 26, 1992, abandoned, which is a continuation-in-part of Ser. No. 637,931, Jan. 14, 1991, abandoned.

[51] Int. Cl.⁶ .................................................. A63B 49/08
[52] U.S. Cl. .......................... 473/301; 473/549; 473/568
[58] Field of Search .................................... 473/300, 301, 473/302, 549, 568

[56] References Cited

U.S. PATENT DOCUMENTS

| | | | |
|---|---|---|---|
| 1,139,843 | 5/1915 | Brown . | |
| 1,556,781 | 10/1925 | Gjorup . | |
| 1,701,856 | 2/1929 | Kraeuter . | |
| 1,940,104 | 12/1933 | Russell et al. | 273/81 |
| 1,943,399 | 1/1934 | Smith | 273/81 |
| 2,003,917 | 6/1935 | Bowden | 273/75 |
| 2,046,164 | 6/1936 | Herkner | 273/81 |
| 2,086,062 | 7/1937 | Bray | 273/81 |
| 2,166,044 | 7/1939 | Fletcher | 273/75 |
| 2,166,045 | 7/1939 | Fletcher | 273/75 |
| 2,513,655 | 7/1950 | Lamkin et al. | 273/81 |
| 3,582,456 | 6/1971 | Stolki | 161/165 |
| 3,654,066 | 4/1972 | Fukushima et al. | 161/160 |
| 3,845,954 | 11/1974 | Case | 273/75 |
| 3,848,480 | 11/1974 | Oseroff | 74/558.5 |
| 3,848,871 | 11/1974 | Sweet | 273/75 |
| 3,860,469 | 1/1975 | Gregorian et al. | 156/83 |
| 3,881,521 | 5/1975 | Johansen et al. | 138/126 |
| 3,899,172 | 8/1975 | Vaughn et al. | 273/73 |
| 4,015,851 | 4/1977 | Pennell | 273/75 |
| 4,044,625 | 8/1977 | D'Haem | 74/558.5 |
| 4,070,020 | 1/1978 | Dano | 273/73 |
| 4,100,006 | 7/1978 | Buckley | 156/78 |
| 4,174,109 | 11/1979 | Gaiser | 273/81.6 |
| 4,284,275 | 8/1981 | Fletcher | 273/75 |
| 4,347,280 | 8/1982 | Lau et al. | 428/304.4 |
| 4,454,187 | 6/1984 | Flowers et al. | 428/159 |
| 4,567,091 | 1/1986 | Spector | 428/222 |
| 4,647,326 | 3/1987 | Pott | 156/77 |
| 4,660,832 | 4/1987 | Shomo | 273/73 |
| 4,662,415 | 5/1987 | Proutt | 150/52 |
| 4,736,949 | 4/1988 | Muroi | 273/73 |
| 4,765,856 | 8/1988 | Doubt | 156/212 |
| 4,853,054 | 8/1989 | Turner et al. | 156/78 |
| 4,934,024 | 6/1990 | Sexton, I | 16/111 |
| 5,042,804 | 8/1991 | Uke | 273/75 |
| 5,110,653 | 5/1992 | Landi | 428/116 |
| 5,275,407 | 1/1994 | Soong | 273/73 |

FOREIGN PATENT DOCUMENTS

| | | |
|---|---|---|
| 2398099 | 7/1977 | France . |
| 2805314 | 8/1979 | Germany . |
| 3414978 | 10/1985 | Germany . |
| 443228 | 2/1936 | United Kingdom . |
| 870021 | 6/1961 | United Kingdom . |
| 979242 | 1/1965 | United Kingdom . |

*Primary Examiner*—William M. Pierce
*Attorney, Agent, or Firm*—Fulwider Patton Lee & Utecht, LLP

[57] ABSTRACT

A shock absorbing grip for a golf club having a strip formed of a polyurethane layer bonded to a felt layer, and a resilient sleeve which is applied to a golf club handle. The strip is spirally wrapped about the golf club handle with the side edges being formed with recessed reinforcement side edges which are tightly butted together. The starting end of the strip is skived to provide a smooth configuration of the strip around the upper end of the sleeve.

17 Claims, 5 Drawing Sheets

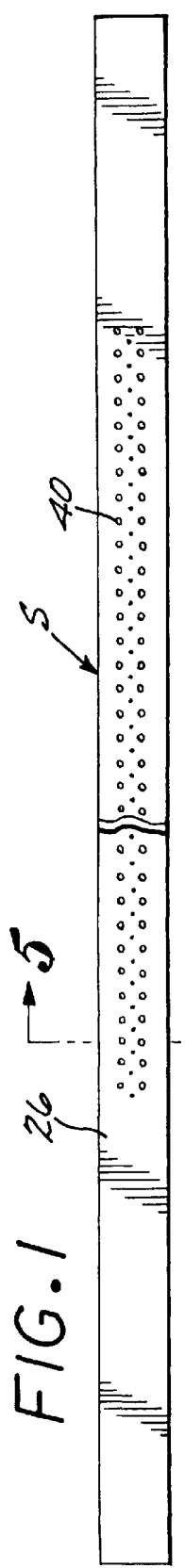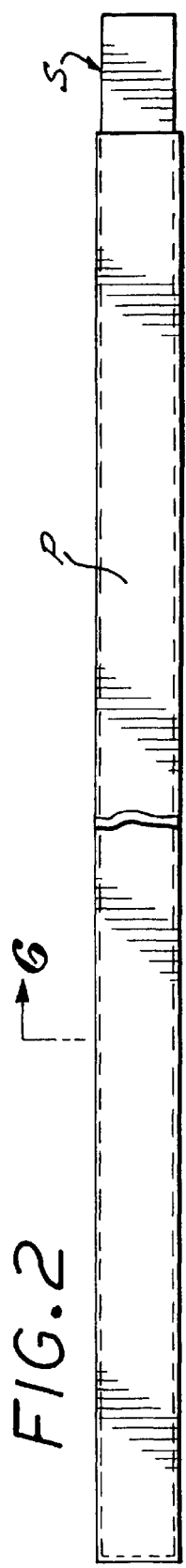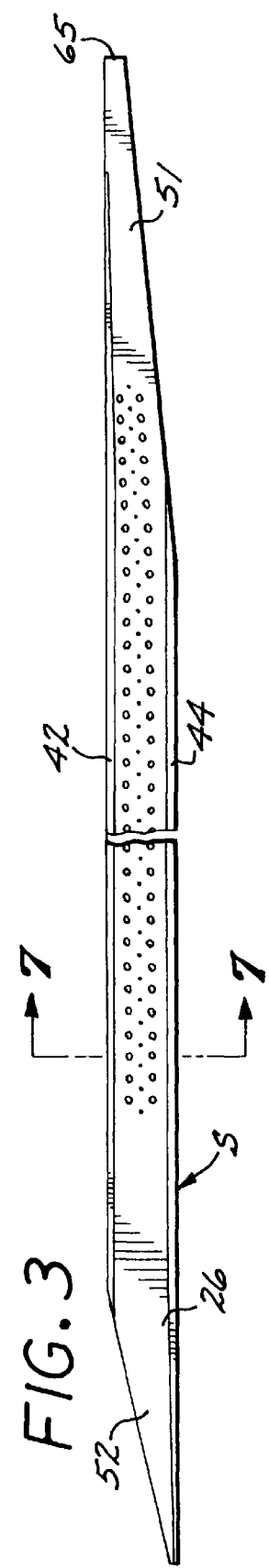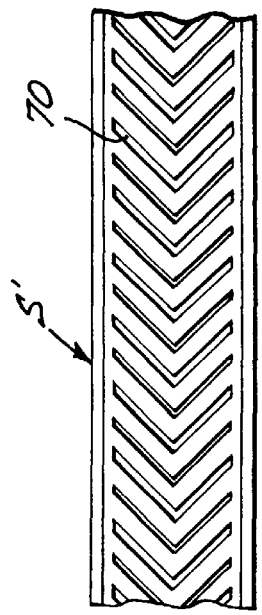

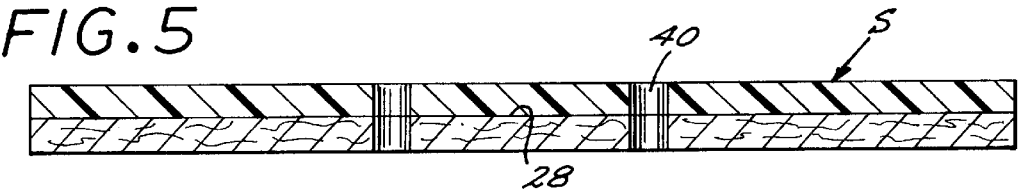
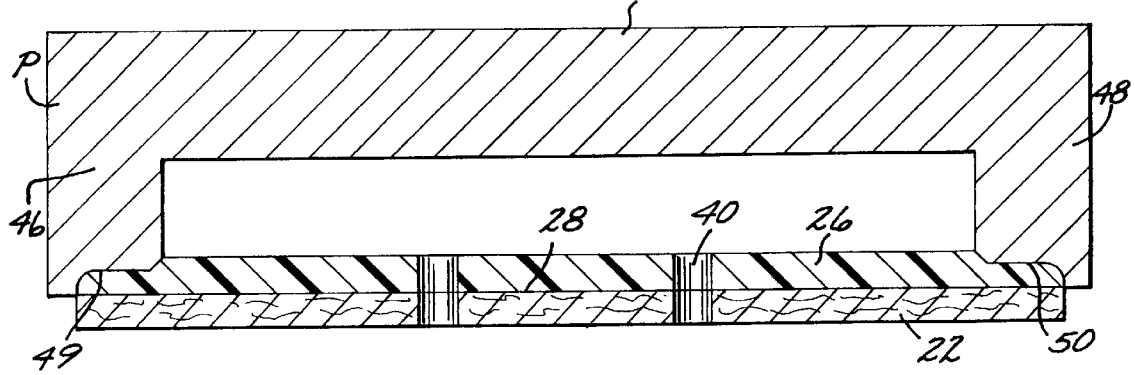
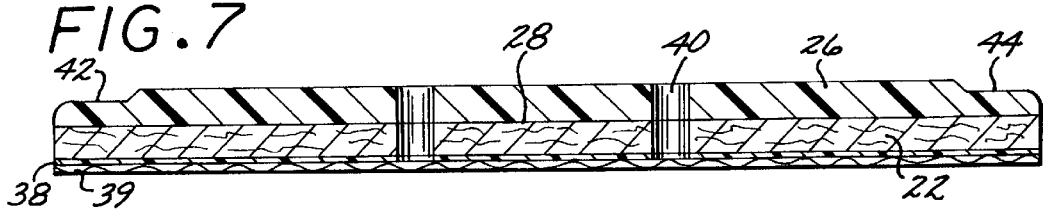
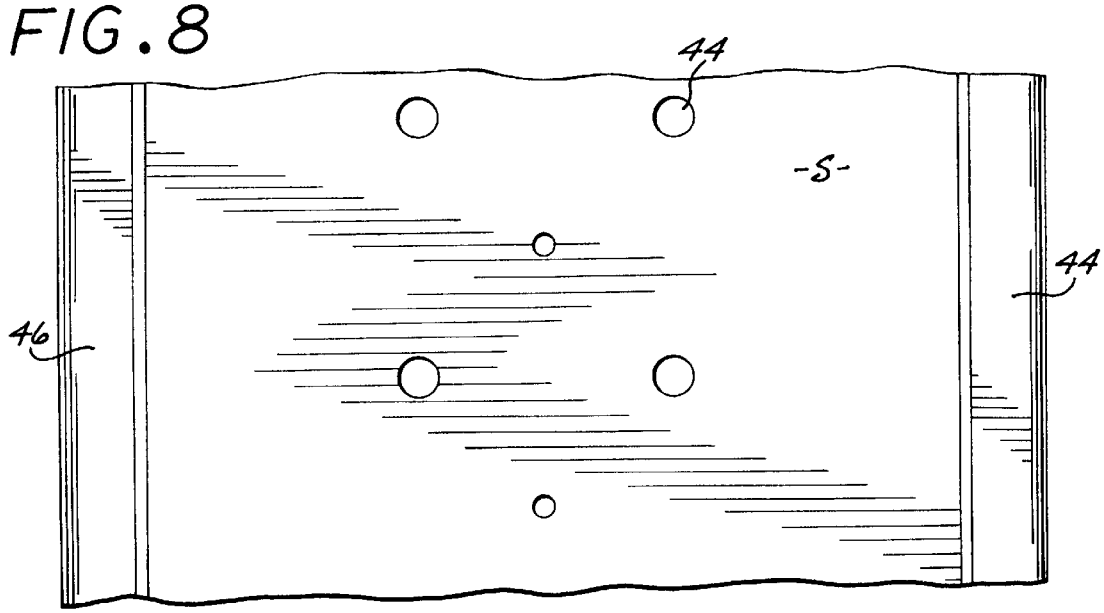

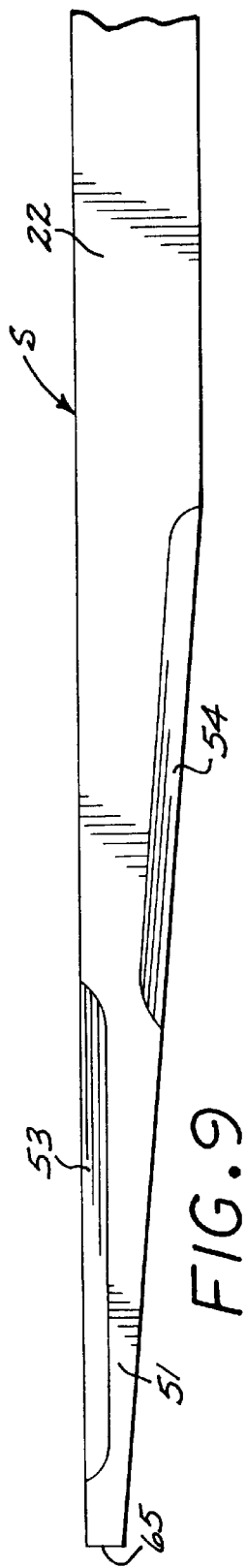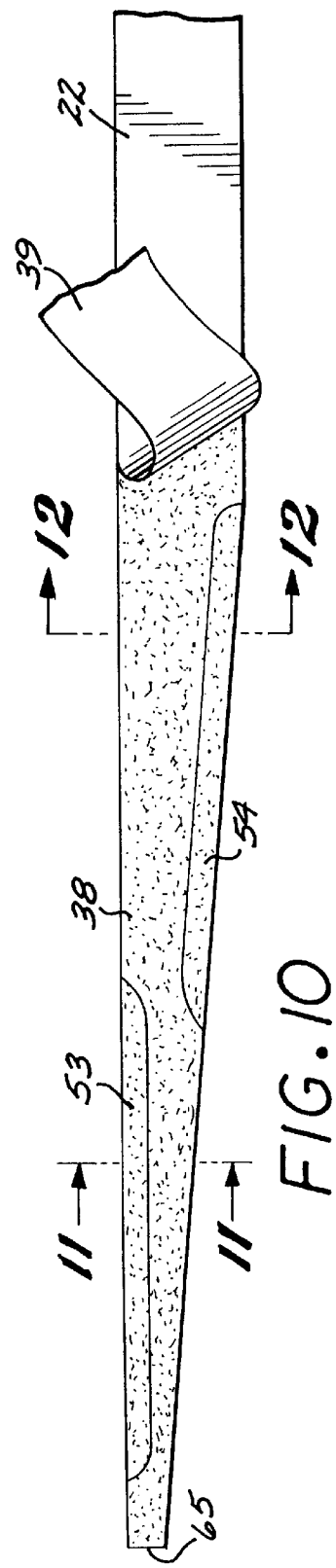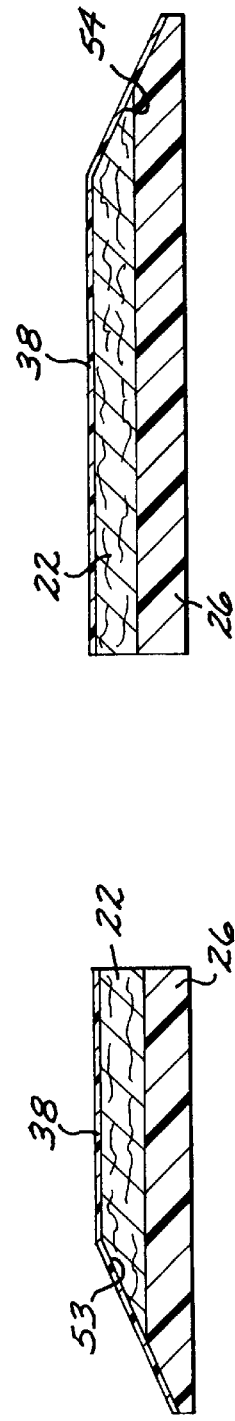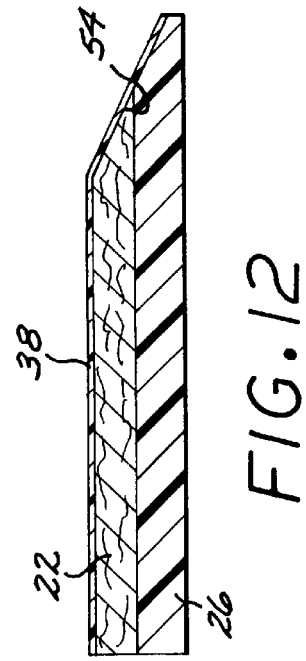

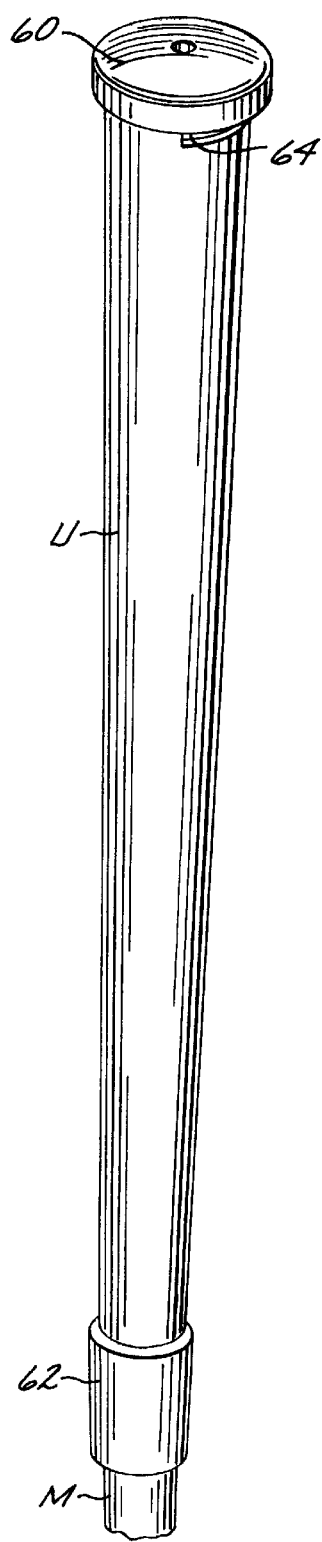
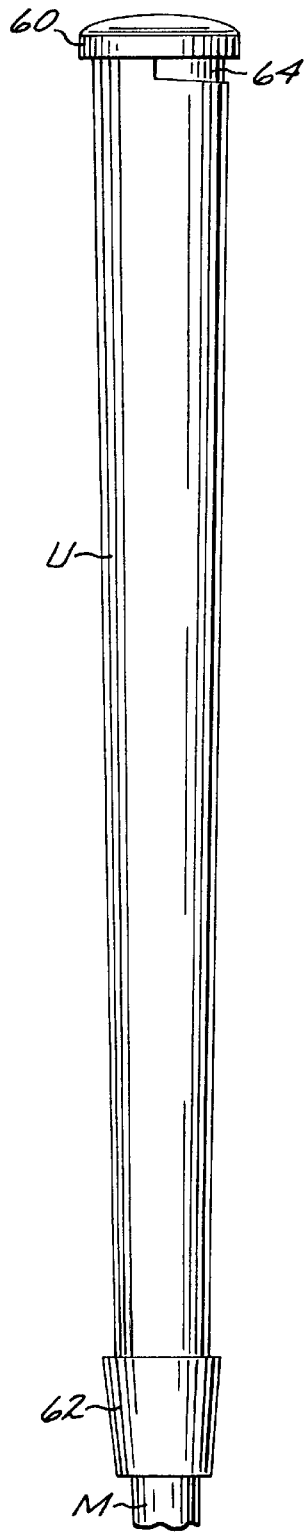
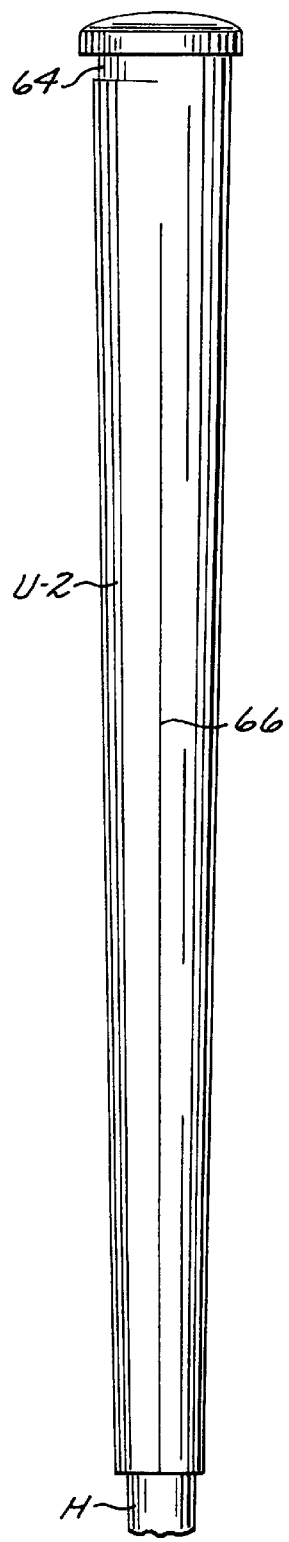

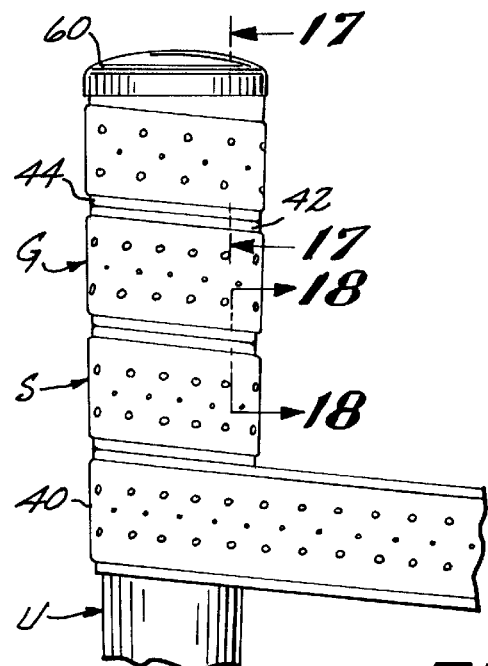
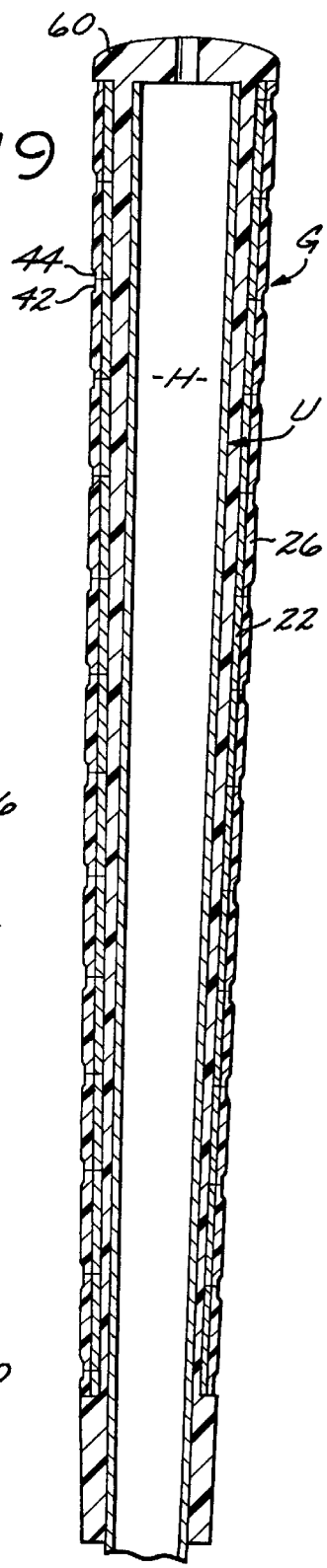
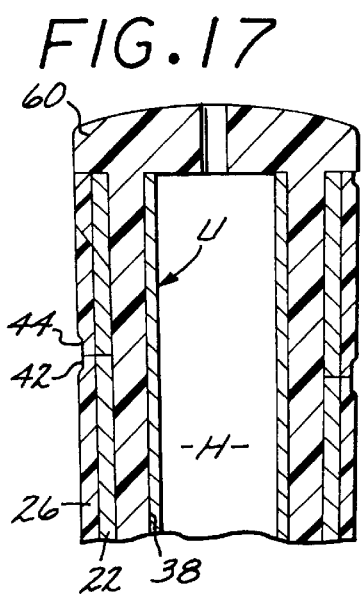
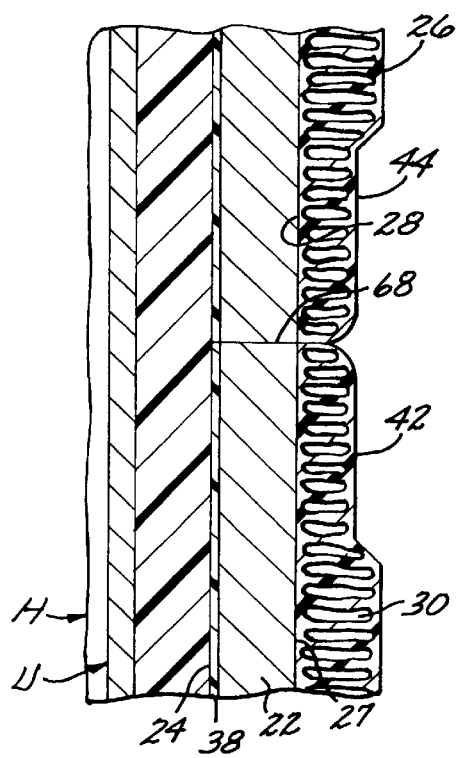

GOLF CLUB GRIP AND METHOD OF MAKING SAME

This application is a Continuation-In-Part of application Ser. No. 08/787,828 filed Jan. 23, 1997 now U.S. Pat. No. 5,730,669, which was a Continuation-In-Part of application Ser. No. 08/567,339 filed Dec. 28, 1995, abandoned, which was Continuation-In-Part of application Ser. No. 08/542,009 filed Nov. 13, 1995, now U.S. Pat. No. 5,645,501, which was a Continuation-In-Part of Ser. No, 08/058,313 filed on May 3, 1993 now, U.S. Pat. No. 5,695,418, which was a Continuation-In-Part of Ser. No. 07/953,190 filed on Sep. 29, 1992, now abandoned, which was a Continuation-In-Part of Ser. No. 07/890,383 filed on May 26, 1992, now abandoned, which was a Continuation-In-Part of Ser. No. 07/637,931 filed on Jan. 14, 1991 now abandoned.

BACKGROUND OF THE INVENTION

The present invention relates to an improved grip for golf clubs and other sporting equipment employing handles that are subject to shock when such devices are impacted, as for example, tennis ball racquets, racquetball racquets, and baseball bats.

It is well known that shock generated by impact between a device such as a golf club and a golf ball can adversely affect muscle tissue and arm joints such as elbow joints. The energy generated by such impact is usually of high frequency and short duration with rapid decay, and which is often known as "impact shock." Tight grasping of a golf club grip to keep it from slipping in a golfer's hands contributes to such impact shock. The grip of the present invention successfully reduces or even eliminates impact shock to the muscle tissue and arm joints of the users of golf clubs.

Applicant has previously developed resilient grips which successfully reduce or even eliminate impact shock to the muscle and arm joints of the users of golf clubs and the like. See, for example, U.S. Pat. No. 5,374,059 granted to applicant Dec. 20, 1994, and U.S. Pat. No. 5,584,482 granted to applicant Dec. 17, 1996. Such earlier grips utilize a polyurethane layer bonded to a felt layer to define a strip which is spirally wrapped around the handle of a golf club or the like to conform generally to the external configuration of such handle. In such earlier grips of applicant's design, the thickness of the polyurethane layer relative to the thickness of the felt layer as compared to prior art resilient grips, i.e. the ratio of the thickness of the polyurethane layer to the thickness of the felt layer was a minimum of approximately 0.18, with the thickness of the polyurethane layer having been about equal to or thicker than the thickness of the textile layer in a typical grip of my design. In early designs of such grips the handle-abutting side of the strip utilized skiving, with the felt layer tapering from a transverse central region upwardly and outwardly towards the transverse side edges of the strip. The side edges of the strip were overlapped as the strip was wrapped around the handle so that the strip did not have a smooth configuration along its length. Additionally, the skiving tended to weaken the grip. Moreover, the side edges of the strip tended to unravel in use. It was also determined that where the strip was not properly applied to a golf club handle, the grip would tend to loosen relative to the handle, particularly when a golf club is withdrawn from a golf club bag. My later designs utilized a strip having flat side edges which abutted one another when the strip was spirally wrapped about the club. Although such abutting arrangement was an improvement over the skived edge arrangement, the side edges of the strip still had a tendency to become loosened relative to the golf club shaft.

SUMMARY OF THE INVENTION

Applicant has discovered that polyurethane and felt grips of the aforedescribed nature can be made without skiving to thereby afford a stronger, longer lasting grip. By eliminating skiving, the grip of the present invention provides a longer lasting stronger grip which resists unraveling in use. Additionally, since the side edges of the strip are butted together as the strip is wrapped about the handle, the grip provides a smoother configuration over the entire grip surface. The improved grip of the present invention also incorporates an adhesive material that covers the inner surface of the felt layer to facilitate wrapping the strip about the handle and afford increased securement of the grip to the handle as the grip is used, with the tighter the grasp of the player the tighter the securement of the grip to the handle. The grip of the present invention additionally reduces the manufacturing time and therefore the cost of the grip to the user as compared to prior grips. Moreover, it is easier to properly wrap the strip onto the handle so as to obtain a firm attachment of the grip to the handle.

The grip of the present invention utilizes a polyurethane and felt strip having sidewardly and outwardly curved reinforcement side edges along its length. Such side reinforcement edges inhibit unraveling of the grip from the racquet or golf club handle, enhances the frictional grip of the golfer's hands on the club, and provides an improved appearance over existing grips. The strip is spirally wrapped about a tapered resilient sleeve that is applied to the upper end of a golf club shaft. Additionally, the strip of my new grip utilizes a skived starting end which cooperates with the sleeve to provide a smooth configuration of the strip on the upper portion of the sleeve. My new golf club also reduces interference with other golf club grips as a club is withdrawn from a golfer's bag. The grip of the present invention may either be used to as a replacement grip, or, alternatively be fabricated as original equipment by a manufacturer of golf clubs. The strip may be spirally wrapped about the sleeve while the sleeve is disposed upon a golf club shaft, or alternatively, the strip may be spirally wrapped about the sleeve while the sleeve is positioned on a collapsible mandrel to provide a slip-on replacement grip.

The golf club grip of the present invention has been found to greatly cushion the shock transferred from a golf club to the golfer's body and thereby prevent the danger of injury to the golfer during a golf swing.

These and other features and advantages of the present invention will become apparent from the following detailed description, when taken in conjunction with the accompanying drawings.

BRIEF DESCRIPTION OF THE DRAWINGS

FIG. 1 is a top plan view of the strip member of a golf club grip embodying the present invention before it is formed with sidewardly and outwardly curved reinforcement side edges and tapered starting and trailing ends;

FIG. 2 is a top plan view showing a heated platen utilized to form sidewardly and outwardly curved reinforcement side edges along the length of the strip of FIG. 1;

FIG. 3 is a top plan view of the strip of FIGS. 1 and 2 after the sidewardly and outwardly curved reinforcement side edges have been formed along the major portion of the length of such strip and the starting and trailing ends have been tapered;

FIG. 4 is a top plan view of a second form of strip embodying the invention shown in enlarged scale relative to FIGS. 1, 2, and 3;

FIG. 5 is a vertical sectional view taken in enlarged scale along line 5—5 of FIG. 1;

FIG. 6 is a vertical sectional view taken in enlarged scale along line 6—6 of FIG. 2;

FIG. 7 is a vertical sectional view taken in enlarged scale along line 7—7 of FIG. 3;

FIG. 8 is a broken top plan view of the strip shown in FIG. 3;

FIG. 9 is a broken top plan view showing the starting end of the strip embodying the present invention which has been skived to define leading and trailing areas;

FIG. 10 is a view similar to FIG. 9 showing the removal of an adhesive-carrying tape which is secured to the underside of the strip;

FIG. 11 is a vertical sectional view taken in enlarged scale along line 11—11 of FIG. 10;

FIG. 12 is a vertical sectional view taken in enlarged scale along line 12—12 of FIG. 10;

FIG. 13 is a perspective view of a first form of underlisting sleeve forming a part of the grip of the present invention;

FIG. 14 is a side elevational view of the grip of FIG. 13;

FIG. 15 is a side elevational view of a second form of underlisting sleeve rotated 90 degrees from the position shown in FIG. 14;

FIG. 16 is a broken side elevational view showing the aforementioned strip being spirally wrapped around the underlisting sleeve of FIGS. 13 and 14 to form a grip embodying the present invention;

FIG. 17 is a vertical sectional view taken in enlarged scale along line 17—17 of FIG. 16;

FIG. 18 is a vertical sectional view taken in further enlarged scale along line 18—18 of FIG. 16; and FIG. 19 is a central vertical sectional view of a completed grip embodying the present invention affixed to the handle of a golf club.

DETAILED DESCRIPTION OF PREFERRED EMBODIMENTS

Referring to the drawings, a preferred grip G embodying the present invention shown in FIGS. 16 and 19 utilizes an elongated resilient strip S which is spirally wrapped about golf club handle H, as shown in FIG. 19. Referring to FIGS. 3, 5, and 18, strip S includes an open-pored felt layer, generally designated 22, having an inner or bottom surface 24 which is adhered to an underlisting sleeve U attached to golf club handle H. The strip S also includes a smooth closed pore polyurethane layer, generally designated 26, which is bonded to the felt layer 22. The bonded-together polyurethane and textile layers are seen to be configured as the unitary strip S.

More particularly, the felt layer 22 is formed of a suitable open-pored material and has its upper or outer surface 27 bonded to the lower surface 28 of the polyurethane layer 26. As indicated in FIG. 18, the polyurethane layer 26 is formed with pores 30 which extend vertically, i.e. generally normal to the longitudinal axis of the strip S or golf club handle H when the grip has been affixed to such handle. The polyurethane layer 26 may be formed in a conventional manner by coating one side of a felt strip with a solution of polyurethane (e.g. polyester or polyether) dissolved in a dimethyl formamide (DMF), immersing the coated strip in water baths to displace the DMF and cause the urethanes to coagulate, and finally driving off the water by the application of pressure and heat. In this manner, the pores 30 will extend perpendicularly relative to the longitudinal axis of the strip, while the underside 28 of the polyurethane layer 26 is bonded to the upper surface of the felt strip. As noted hereinbefore, applicant has discovered that greatly improved shock absorbing qualities may be obtained in a racquet or golf club grip where the thickness of the polyurethane layer to the thickness of the felt layer is increased over the thickness of the felt layer employed in prior art grips. More specifically, applicant considers that the ratio of the thickness of the polyurethane layer to the textile layer should be a minimum of approximately 0.18. In the embodiment shown in the drawings, the thickness of the polyurethane layer is preferably about 0.4 millimeters and the thickness of the felt layer is about 0.9 millimeters. Excellent results have been obtained with this ratio.

The polyurethane layer 26 provides a cushioned grasp of the player's hand on a golf club handle and also enhances the player's grip by providing increased tackiness between the player's hand and the grip. The felt layer 22 provides strength to the polyurethane layer 26 and serves as a means for attaching the bonded-together polyurethane and felt strip to a handle. As shown in FIGS. 7 and 8 preferably the underside 24 of the felt layer 22 is provided with a conventional adhesive material 38. The underside of the adhesive material 38 is originally covered with a protective quick-release tape 39 shown in FIGS. 7 and 10. The polyurethane and felt layers may be formed with vertically extending perforations 40 which enhance the absorption rate of perspiration from the hand of a user of grip G.

FIG. 1 is a top plan view of the strip S before it has been cut to the proper dimensions to be wrapped about a golf club handle. In FIG. 2, the strip S is shown being formed with sidewardly and outwardly extending recessed reinforcement side edges, generally designated 42 and 44. FIG. 3 shows the appearance of the strip after such reinforcement side edges 42 and 44 have been formed thereon. The reinforcement side edges 42 and 44 are preferably formed along the major portion of the strip by means of a heated platen P shown in FIGS. 2 and 6. Referring thereto, platen P may be of conventional metal construction having a horizontal base 45 formed at its opposite sides with depending legs 46 and 48. The lower ends of the legs are configured so as to form the recessed reinforcement side edges 42 and 44. Thus, the lower portion of the legs are provided with like—configured mirror image cavities 49 and 50, having a horizontally extending surface, the inner portions of which extend upwardly and inwardly, while the outer edges thereof are curved sidewardly and downwardly. The platen P is heated in a conventional fashion as by means of electrical resistance elements (not shown) and urged downwardly against the sides of the strip S so as to compress side portions of the polyurethane layer 26 below the upper surface of such polyurethane layer in the manner shown in FIG. 6 to define the recessed reinforcement side edges 42 and 44. Such compression increases the density and strength of the polyurethane layer in the vicinity of the side edges 42 and 44. It has been found that the width of the recessed reinforcement side edges 42 and 44 may be approximately 2 millimeters, while the depth of the major portion thereof may approximate 0.5 millimeters.

After the reinforcement side edges 42 and 44 have been formed in the front and rear ends of the strip S are cut to define tapered starting and trailing ends 51 and 52, respectively. Referring now to FIGS. 9–12, the underside of the starting end 51 of strip S is skived to form outwardly and downwardly slanted leading and trailing areas 53 and 54, respectively, on opposite sides of the strip, the rear portion of the leading area 53 slightly overlapping the front portion of the trailing area 54. After the slanted leading and trailing areas 53 and 54 have been formed, adhesive 38 is applied to the underside of the felt layer 22 of strip S, such adhesive initially being covered in a conventional manner by peel away tape 39.

Referring now to FIGS. 13 and 14 there is shown first form of a resilient rubber-like underlisting sleeve U utilized in forming the slip-on version of the grip of the present invention. The underlisting sleeve U is fabricated of synthetic plastic foam or rubber utilizing a cap 60. The lower portion of the underlisting sleeve U is formed with a guide cylinder 62. Below the cap 60, the upper portion of sleeve U is formed with a groove 64 to receive the tip 65 of the starting end of strip S. In FIG. 15 is there is shown a second form of underlisting sleeve U-2 utilized in forming a grip in which the strip S is spirally wrapped about such sleeve while the sleeve is positioned on the shaft H of a golf club. Sleeve U-2 is similar to sleeve U except that it is not formed with a guide cylinder but is formed with a longitudinally extending golf club shaft-receiving slit 66 that extends from the upper portion of the sleeve to the bottom of the sleeve.

Underlisting sleeve U of FIGS. 13 and 14 is removably disposed upon a conventional collapsible mandrel M before strip S is spirally wrapped to provide a slip-on grip embodying the present invention. Underlisting sleeve U-2 is adhered to golf club shaft H before strip S is spirally wrapped about such sleeve. Underlisting sleeve U-2 may be adhered to the upper end of golf club handle H in the manner shown and described in my aforementioned U.S. Pat. No. 5,584,482. Thereafter, referring now to FIGS. 16, 17, and 18, to apply the strip S to either of the underlisting sleeves, the quick-release tape 39 is peeled off the adhesive 38 on the underside of the felt layer 22. The strip S is then spirally wound around the sleeve starting with the upper end of the sleeve. As noted hereinbefore, the starting end 51 of the strip is provided with outwardly and downwardly slanted leading and trailing areas 53 and 54 on opposite edge portions of the strip. The tip 65 of the strip's starting end is inserted in groove 64 of the sleeve and the strip is wrapped about 1½ times around the upper or butt end of the sleeve, with a smooth configuration of the strip on the sleeve below cap 60 resulting from the utilization of such slanted overlapped areas, as indicated particularly in FIG. 16.

As indicated in FIGS. 16–19, the edges of the strip S do not overlap, and, instead, their radially extending surfaces butt tightly against one another, as shown at 68. It is important to note that the two abutting side edges of the strip afford a very firm contact between these side edges, since the polyurethane layer 26 is compressed by the heating platen P when the recessed reinforcing side edges are formed in the manner shown in FIG. 6. Such compression increases the strength of the polyurethane material in the vicinity of the butt joint. Such firm contact would not be possible if the strip was formed solely of polyurethane, since polyurethane is quite soft as compared to felt. Tight abutment of the strip's side edges ensure that strip S does not unravel relative to the underlisting sleeves, even when the grip G is exposed to hard wear during play. As a result, applicant's grip is more durable and hence affords a longer service life than prior art grips. The provision of the recessed reinforcing side edges 42 and 44 improves the frictional contact of the user's hand relative to the golf club handle, and reduces interference with other golf club grips when a club is removed from a golf bag to thereby reduce wear and tear on such grips.

It should be understood that where the strip S is spirally wrapped around underlisting sleeve U while the sleeve is supported on collapsible mandrel M, and after the strip has been spirally wrapped around the sleeve, the mandrel is collapsed and the sleeve and strip assembly axially withdrawn therefrom. The resulting assembly defines a grip embodying the present invention which may be marketed as a replacement grip or as original equipment installed on a complete golf club (the so-called slip-on grip in the golf industry). When the underlisting sleeve U is slipped over collapsible mandrel M, the guide cylinder 62 rigidifies the comparatively flexible lower end of the sleeve U to facilitate the slip-on operation.

Referring to FIG. 4, the upper portion of the polyurethane layer of strip S may be formed with treads 70 in order to enhance the frictional contact of a golfer's hands with a golf club grip of the present invention. It is an important advantage of the present invention that normally the underlisting sleeves need to be installed on a golf club shaft only one time. Thereafter, when it becomes desirable to replace the strip S, it is only necessary to remove the original strip from the sleeve and replace such original strip with a new strip. This simple operation can be conducted by a golfer and does not require the golf club be taken to a golf shop.

It will be apparent to those skilled in the art, that various modifications can be made without departing from the spirit and scope of the present invention. Accordingly, it is not intended that the invention be limited except by the appended claims.

What is claimed is:

1. A golf club grip comprising:

a strip consisting of an open-pored felt layer having a generally flat inner surface and a smooth closed pore polyurethane layer having its inner surface bonded to the outer surface of the felt layer, with the pores of such polyurethane layer extending generally normal to the longitudinal axis of the strip, and with the textile layer providing strength for the polyurethane layer while the polyurethane layer both absorbs shocks and provides tackiness so as to inhibit slippage of a user's hand;

said strip having a starting end and a trailing end;

the underside of said starting end being skived to form outwardly and downwardly slanted leading and trailing areas;

heat compressed radially inwardly extending reinforcement side edges formed in the polyurethane layer of the strip along the length of the strip;

a resilient underlisting sleeve having an upper end and a lower end;

the strip being spirally wrapped about exterior of the underlisting sleeve with the side edges of the strip being in tight abutment and with the side edges of the felt layer being in firm contact with one another whereby the exterior surface of the strip adjacent the sleeve is of smooth non-overlapping configuration and unraveling of the strip from the sleeve of the strip is inhibited; and with the starting end of the strip being engaged with the upper end of the sleeve, and the rear portion of the leading area overlapping the trailing area to provide a smooth configuration of the strip on the upper portion of the sleeve.

2. The grip of claim 1 wherein the felt layer abuts and is adhered to the exterior of the underlisting sleeve.

3. The grip of claim 1 wherein the thickness ratio of the polyurethane layer to the felt layer is about equal to or larger than 0.18.

4. The grip of claim 1 wherein the polyurethane layer is about equal in thickness to the felt layer.

5. The grip of claim 1, wherein the strip is formed with perforations to enhance the absorption rate of perspiration from a player's hands.

6. The grip of claim 1, where the polyurethane layer is formed over its upper portion with a plurality of treads to reduce slippage of a player's hand relative to the grip.

7. The grip of claim 1 wherein the upper end of the underlisting sleeve is formed with a cap and with a groove below such cap, with the tip of the starting end of the strip being positioned within said groove.

8. The grip of claim 1 wherein the sleeve is formed with a longitudinal golf club shaft-receiving slot.

9. The grip of claim 1 wherein the width of the reinforced side edges is approximately 2 millimeters while the depth of the major portion of such side edges approximates 0.5 millimeters.

10. The grip of claim 2 wherein the upper end of the underlisting sleeve is formed with a cap and with a groove below such cap, with tip of the starting end of the strip being positioned within said groove.

11. The grip of claim 10 wherein the lower end of the underlisting sleeve is formed with a guide cylinder.

12. A method of making a golf club grip, said method comprising:

forming a strip consisting of an open-pored felt layer having a generally flat inner surface and radially extending side edges, and a flat closed pore polyurethane layer having its inner surface bonded to the outer surface of the felt layer, with the pores of such polyurethane layer extending generally normal to the longitudinal axis of the strip, and with the felt layer providing strength for the polyurethane layer while the polyurethane layer both absorbs shocks and provides tackiness so as to inhibit slippage of a user's hand;

tapering the ends of the strip to define a starting end and a trailing end;

skiving the starting end of the strip to define outwardly and downwardly extending leading and trailing areas;

heat compressing radially inwardly extending reinforcement side edges in the polyurethane layer of the strip along the length of the strip;

providing a tapered resilient golf club shaft-engaging underlisting sleeve having an upper end and a lower end;

engaging the starting end of the sleeve with the upper end of the sleeve; and spirally wrapping the strip about the sleeve to define said grip, with the radially extending side edges of the felt layer being in tight abutment whereby the exterior surface of the strip is of non-overlapping configuration, unraveling of the strip is inhibited, the strength of the side edges is increased and frictional contact between a user's hands and the grip is enhanced and with the rear portion of the leading area of the starting end overlapping the trailing area to provide a smooth configuration of the strip on the upper portion of the sleeve.

13. A method of making a golf club grip, such method comprising:

forming a strip consisting of an open-pored felt layer having a generally flat inner surface and radially extending side edges, and a flat closed pore polyurethane layer having its inner surface bonded to the outer surface of the felt layer, with the pores of such polyurethane layer extending generally normal to the longitudinal axis of the strip, and with the felt layer providing strength for the polyurethane layer while the polyurethane layer both absorb shocks and provides tackiness so as to inhibit slippage of a user's hand;

tapering the ends of the strip to define a starting end and a trailing end;

skiving the starting end of the strip to define outwardly and downwardly extending slanted leading and trailing areas;

heat compressing radially inwardly extending reinforcement side edges in the polyurethane layer of the strip along the length of the strip;

providing a tapered underlisting sleeve having an upper end and a lower end;

forming a cap on the upper end of the sleeve, a notch below such cap, and a guide cylinder on the lower end of the sleeve;

inserting the tip of the starting end of the strip in said notch; and spirally wrapping the strip about the sleeve with the radially extending side edges of the felt layer being in tight abutment whereby the exterior surface of the strip is of non-overlapping configuration, unraveling of the strip from the sleeve is inhibited, the strength of the side edges of the strip is increased and frictional contact between a user's hands and the strip is enhanced, and with the rear portion of the leading area overlapping the trailing area of the strip to provide a smooth configuration of the strip on the upper portion of the sleeve.

14. The method of claim 12 wherein the lower end of the underlisting sleeve is formed with a guide cylinder and the sleeve is supported on a collapsible mandrel while the strip is spirally wrapped about the sleeve.

15. The method of claim 12 wherein the underlisting sleeve is supported on a golf club shaft while the strip is spirally wrapped about the sleeve.

16. The method of claim 13 wherein the underlisting sleeve is supported on a collapsible mandrel while the strip is spirally wrapped about the sleeve.

17. The method of claim 13 wherein the underlisting sleeve is supported on a golf club shaft while the strip is spirally wrapped about the sleeve.

* * * * *